United States Patent

[11] 3,631,610

| | | |
|---|---|---|
| [72] | Inventor | Albert Ernest Cutler<br>Barnet, England |
| [21] | Appl. No. | 841,464 |
| [22] | Filed | July 14, 1969 |
| [45] | Patented | Jan. 4, 1972 |
| [73] | Assignee | Redifon Limited<br>London, England |

[54] METHOD AND APPARATUS FOR PRODUCING A VISUAL DISPLAY OF A SCENE BY DIRECT OPTICAL PROJECTION
5 Claims, 20 Drawing Figs.

[52] U.S. Cl. ................................................ 35/12 N
[51] Int. Cl. ................................................ B64g 7/00, G09b 9/08
[50] Field of Search ................................................ 35/12 N; 352/86; 353/69, 70, 121

[56] References Cited
UNITED STATES PATENTS

| | | | |
|---|---|---|---|
| 3,071,875 | 1/1963 | Hemstreet ............ | 35/12 N |
| 3,233,508 | 2/1966 | Hemstreet ............ | 35/12 N |
| 3,401,228 | 9/1968 | Barnes ................. | 35/12 N |
| 3,439,105 | 4/1969 | Ebeling et al. ....... | 35/12 |

Primary Examiner—Robert W. Michell
Assistant Examiner—L. R. Oremland
Attorney—Larson, Taylor and Hinds ABSTRACT: Method and apparatus for producing a visual display, particularly for an aircraft flight simulator, comprising making a moving picture film record of a terrestrial surface and projecting the film onto a screen, the terrestrial surface plane, film gate plane and projection screen plane being colinear and the screen being viewed for accurate simulated perspective.

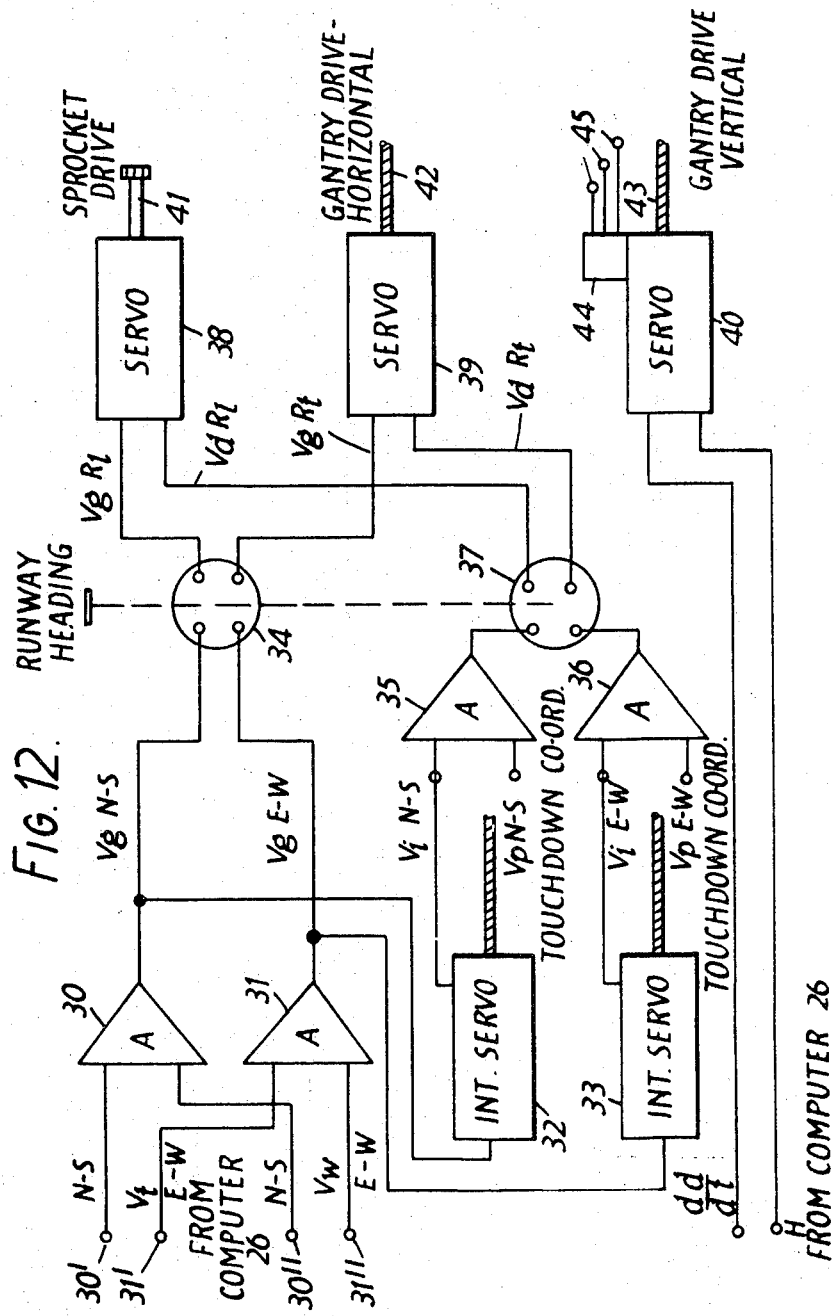

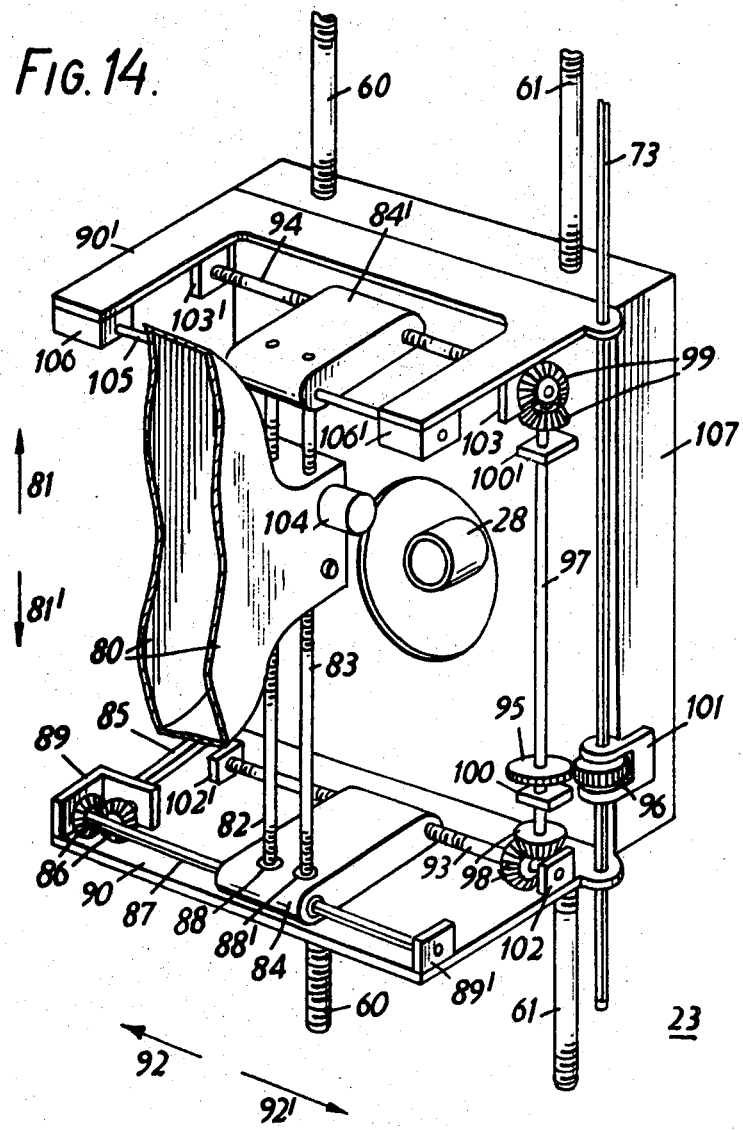

METHOD AND APPARATUS FOR PRODUCING A VISUAL DISPLAY OF A SCENE BY DIRECT OPTICAL PROJECTION

This invention relates to an improved method and apparatus for producing, by direct optical projection of a succession of photographic images, a visual display of a scene such as would be seen from a moving vehicle, for example, an aircraft in flight. A continuously changing scene is provided in which visual effects resulting from appreciable deviations of the actual course followed, from an ideal course, are realistically represented.

In visual systems associated with flight simulators for the training of pilots, a picture is created on a screen in front of the trainee pilot, representing the view of the ground which he would expect to see according to his computed position, height and aircraft attitude angles. Several methods of creating such a picture are known and have been extensively described. They fall into three categories:

1. Systems using models in which the picture is presented to the trainee pilot through a closed circuit television link;
2. Systems based upon direct projection of a ground transparency, such as an aerial survey photograph; and
3. Systems based upon transparencies or films taken in direction looking forward along a selected flight path, the picture projected therefrom being modified to accommodate deviation from this path by anamorphic lenses.

In general, the television method is characterized by poor resolution, obtrusive line structure, misregistration of colors, noise, smearing and poor highlight rendering. The apparatus is bulky and expensive, and the method demands the use of a very considerable amount of light on the model, which must, consequently, be made extremely durable to withstand the heating effects of the lighting. Despite these limitations and objections, it is the only system in common use at the present.

Systems based on plane transparencies representing the ground, rely on the use of very small aperture objectives to give the semblance of focus necessary, while at the same time introducing distortions on an empirical basis to simulate perspective. In general, they suffer from geometrical distortion, poor resolution and poor brightness. There can be no vertical elements visible in the pictures produced by them.

In systems based upon anamorphic lenses, the design problems associated with the variable anamorphic elements are such that they have a restricted angular field. Consequently, they are of limited use in meeting main airline requirements, where a 60° horizontal field is considered to be essential.

It is an object of the present invention to provide optical apparatus for producing a visual display of a scene, such as would be seen from a moving vehicle, in which conventional lenses only are used. Such lenses are capable of working at larger apertures and with a larger field of view than those of the anamorphic systems and therefore, of giving brighter, larger and potentially clearer pictures.

Accordingly, the present invention provides, according to one aspect thereof, a method of producing a visual display of an area of a surface as it would appear when viewed from a selected viewpoint, comprising the several steps as follows:

1. The transfer of picture information from an area of the surface viewed on to a recording surface, through a first imaging system;
2. The projection of the picture information recorded on the recording surface, or a copy of it, on to a viewing screen, through a second imaging system;
3. The locating of an observer with respect to the projection apparatus in a position which is related to the required effective viewpoint; and
4. The adjustment of parameters of the projection system so that a perspective view is obtained which corresponds to that which would be obtained from the defined instantaneous position of the viewpoint with respect to the surface.

According to a second aspect thereof, the invention provides apparatus embodying features of construction, combinations of elements and arrangements of parts which are adapted to effect the steps of the method of producing a visual display described in the preceding paragraph, as exemplified in the detailed disclosure which follows.

It is a feature of the system of the present invention that the perspective transformations achieved are rigorously accurate for the ground plane. Vertical elements are correctly displayed when the path is near to the original path followed.

A further feature of the system of the present invention is that the picture information may be obtained from a surface provided by a model and that the model need not be especially durable.

Another feature of the invention is that, in one arrangement of the apparatus, the whole of the picture information on the transparency may be transferred to the viewing screen.

In order to facilitate the understanding of the equipment required to implement the invention, an outline of the theory applied therein will be given, and an embodiment of the invention will now be described in detail, by way of example, with reference to the accompanying drawings, in which:

FIG. 12 is a block schematic diagram of computing systems of track recorder and visual display apparatus;

FIG. 14 is a diagrammatic perspective view of mechanism by which movement of the projector is provided.

There is a theorem in projective geometry which states that if three planes have a line common to all, the result of two successive projections is equivalent to a single projection.

Figure 1:
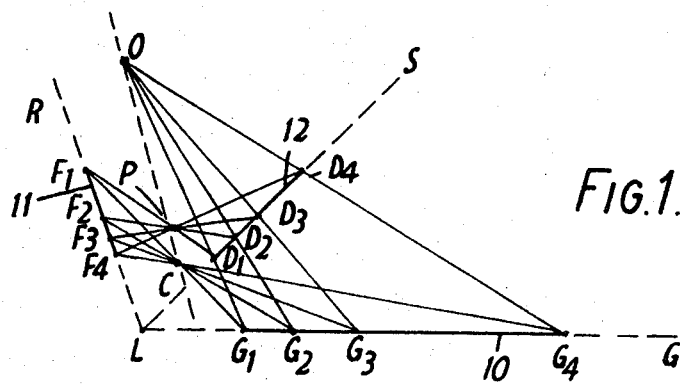
FIG. 1 is a diagram illustrating a theorem in projective geometry as it is applied to visual display apparatus of the present invention.

The theorem, as applied to the visual system of the present invention, is illustrated in FIG. 1. In the figures, $G_1$, $G_2$, $G_3$ and $G_4$ are points on a surface 10, included in a ground plane, which is represented in the drawing by line L–G. The surface may be an area of the surface of the earth or it may be provided by a model.

A camera lens at a position C produces an image $F_1$, $F_2$, $F_3$, and $F_4$ of the points $G_1$, $G_2$, $G_3$ and $G_4$ on a recording surface 11, included in a plane which is represented in the drawing by the broken line L–R. A projector lens at a position P produces a display $D_1$, $D_2$, $D_3$ and $D_4$ on a display screen 12 included in a plane which is represented in the drawing by the broken line L–S, of the developed image $F_1$, $F_2$, $F_3$ and $F_4$ recorded on the recording surface. To an observer located at a position O, the display $D_1$, $D_2$, $D_3$ and $D_4$ is a projection of the points $G_1$, $G_2$, $G_3$ and $G_4$.

It will be apparent from the diagram that the plane L–G, L–R and L–S intersect along a common line, shown in section as L in FIG. 1, as is required for application of the theorem referred to. The theorem is true for all points on the surface 10 and the theorem has a further property that the points O, P and C, are collinear.

The consequence of the theorem is that an observer at O would see the same view on the display screen as he would see from O, looking directly at the ground. The ability to control the location of the point O by moving the point P is the essence of the present visual system.

Figure 2A:
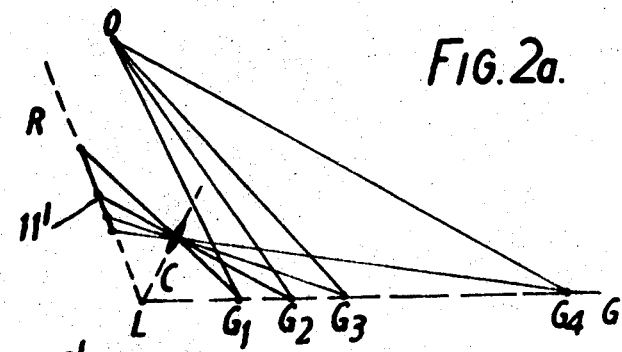
FIGS. 2a and 2b are diagrams showing how the theorem is applied to apparatus for producing a visual display in which separate equipments are used for recording and projection.
Figure 2B:
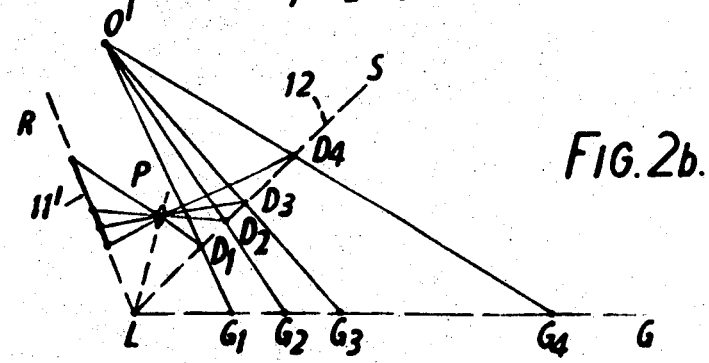

In a practical system for providing a visual display, the two functions, namely the recording of the picture information and the projection of the recorded picture information are usually carried out in two distinct equipments. As is shown in FIGS. 2a and 2b the relative positions of the lenses, the surfaces and the observer, as shown in FIG. 1, are retained. Hence, the requirements of the theorem are correctly met.

In the practical system, it is convenient to use photographic film as a transfer medium upon which to store the picture information, and in FIG. 2a, it is assumed that the surface 11 of FIG. 1 has been replaced by photographic film, which is indicated in the drawing by the reference number 11. As already described with reference to FIG. 1, the image $F_1$, $F_2$, $F_3$ and $F_4$ of the points $G_1$, $G_2$, $G_3$ and $G_4$ is recorded on the film $11'$.

In FIG. 2b, it is assumed that the film $11'$ has been transferred to a projector in a simulator environment for the purpose of providing a display $D_1$, $D_2$, $D_3$ and $D_4$, on the screen 12. The picture seen by the observer from the position $O'$ will be a realistic view of ground features as provided from the area of the earth's surface or by a model.

The view seen from the position $O'$ will be in the same perspective as the original view seen from the position O.

Figure 3A:
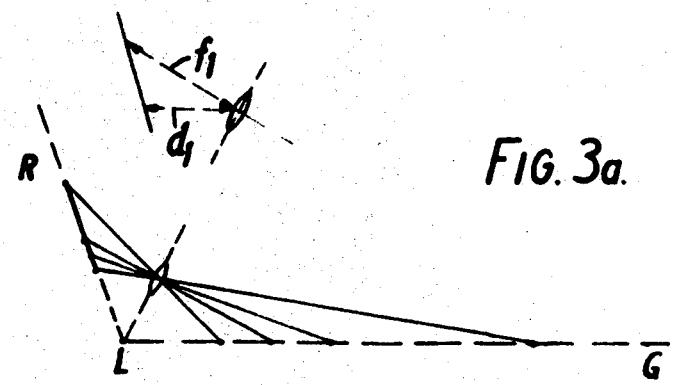
FIGS. 3a and 3b are diagrams in which the arrangements of FIGS. 2a and 2b have been modified to enable conventional lenses and normal film sizes to be used in the apparatus.
Figure 3B:
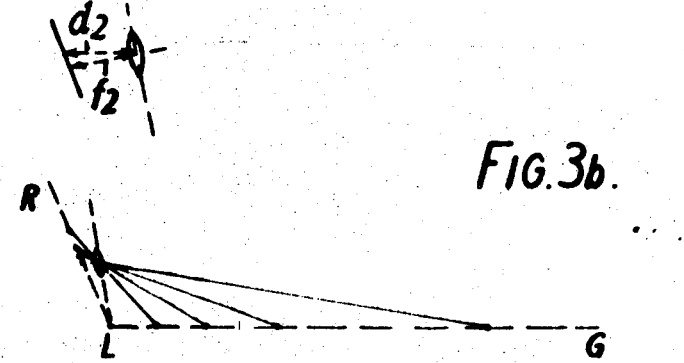

The principle described is difficult to apply without resort to scale changing, if conventional lenses and normal film sizes are to be used. However, scale changing can be accomplished without difficulty while preserving the characteristics essential to maintain the projectivity requirements. Thus, correct angular distribution of the image points is maintained by using the same film tilt in the projector of the simulator as is used for recording the view on the film. In order to preserve focus, changes in lens focal length and inclination are made as is shown in FIGS. 3a and 3b. The image on the film differs only in scale in the ratio $d_1/d_2$.

Figure 4:
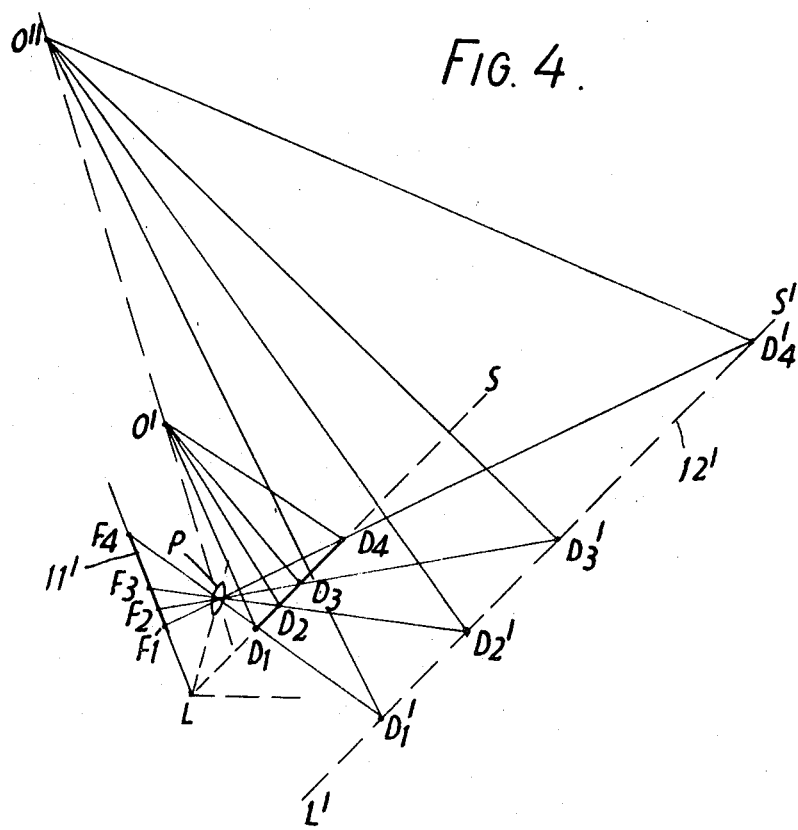
FIG. 4 is a diagram in which the arrangement of FIG. 2b has been modified so as to provide an increase of viewing space.

Referring to FIG. 4, the recording arrangements with respect to film tilt are reproduced in the projector. Also, the plane of the projection lens P is inclined at an angle with respect to the film and screen planes, so as to provide full field focus. Where scale changes are made which necessitate, for example, enlarging the image on the film, a projection lens of appropriate focal length must be employed.

The viewing space may conveniently be increased by parallel displacement of the viewing screen 12 to a new position, in a plane represented in FIG. 4 by the broken line $L'$–$S'$. In the new position a viewing screen $12'$, of larger area is used and is viewed by the observer from a position which is indicated in the drawing by $O''$.

It will be seen that the display $D'_1$, $D'_2$, $D'_3$, and $D'_4$ is in the same perspective from $O''$ as the display $D_1$, $D_2$, $D_3$, and $D_4$ is from $O'$, ($O''D'_1=N\times O'D_1$; $O''D'_4=N\times O'D_4$; $PO''=N\times PO'$; giving similar figures).

The foregoing considerations have shown that it is possible to photograph a scene, in a practical way, and to project a film transparency prepared therefrom, so that when the projected view of the scene is observed, in a practical way, from a predetermined position which is governed by the projector lens position, a view of the scene can be obtained which is in correct perspective. That is to say, a view of the scene can be obtained as if the scene had been photographed from the predetermined position in the first place.

In FIGS. 1, 2a and 2b, 3a and 3b, rays from a number of ground points $G_1$, $G_2$, $G_3$ and $G_4$ are shown. For the sake of simplicity, only rays from the horizon are shown in subsequent figures relating to descriptions dealing with the formulation of control equations used in the system. In these figures, the horizon H is at observer level and the line to the horizon is horizontal.

Figure 5:
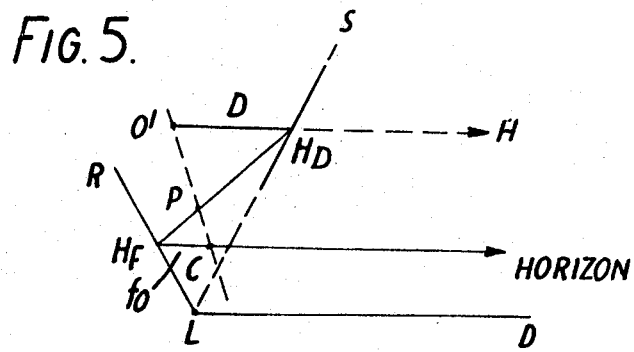
FIG. 5 is a simplified diagram of the arrangements of FIGS. 2a and 2b.

Referring to FIG. 5, in which the surfaces L–D, L–R and L–S are shown in section it will be seen that:

$$\frac{O'H_D}{CH_F} = \frac{O'P}{PC}$$

A diagram for other sections would be similar to that of FIG. 5. Therefore, the equation is true for movements of P in any direction.

The term $CH_F$ is a constant ($f_o$) of the transparency, determined by the method by which it was derived, that is from an area of the surface of the earth or from a model and factors such as lens focal length and the necessary degree of enlargement. Also, it is highly desirable to have the horizon captured on the display screen at a fixed distance D from the observer, (ND if the viewing space is increased), then:

$$\frac{O'P}{PC} = \frac{D}{f_0} \text{ and } \frac{O'C}{PC} = \frac{D+f_0}{f_0}$$

The movement of the origin of perspective is therefore ($D+f_o/f_o$) times the movement of the lens P, or with respect to P, the movement is $D/f_o$ times the movement of P.

In an enlarged viewing space, the term $D/f_o$ becomes $ND/f_o$ times the movement of P.

The above observations apply to movements in directions along axes $x$, $y$, and $z$, hence a single transparency may be used to create all the views obtained in a volume surrounding C and limited only by practical considerations such as lens fields and transparency sizes. Vertical elements in the view, being outside the ground plane do not behave correctly under this transformation and can limit the practical excursion of P.

The required position of the projector lens is derived in the general case simply by first finding the coordinates of C and $O'$ and interpolating. The calculation assumes that the film tilt and $f_o$ are known functions of the taking height and are therefore constants in the projection calculation. Also, it is assumed that D is constant.

Figure 6:
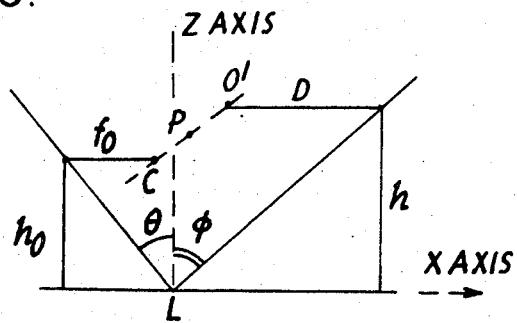
FIG. 6 is a diagram by which the derivation of coordinates relating to lens and observer positions in the apparatus may be explained.

Referring to FIG. 6, it will be seen that the coordinates of C with respect to L are:

$$f_o - h_o \tan \theta, \quad 0, \quad h_o$$

where $h_o$ is the recording height, the $y$ axis being perpendicular to the plane of the paper.

The coordinates of $O'$ are:

$$h \tan \phi - D, \quad \Delta y, \quad h$$

where $h$ is the actual height, and $\Delta y$ is the transverse movement of the observer from the point of recording. The components of C, $O'$ are:

$$h \tan \phi - D + h_o \tan \theta - f_o, \quad \Delta y, \quad h - h_o$$

and the components of C, P are:

$$\frac{f_0}{f_0+D}(h \tan \phi + h_0 \tan \theta - D - f_0), \frac{f_0}{f_0+D} \cdot \Delta y, \frac{f_0}{f_0+D}(h - h_0)$$

The coordinates are determined by the values assigned to $f_o$, $\theta$ and $h_o$ when the transparency was produced, and to D and $\phi$ when the transparency is being reproduced. The quantities $h$ and $y$ are variables.

In the embodiment to be described, the viewing screen is mounted vertically so that:

$$\phi = 0 \quad \quad \ldots\ldots (1)$$

and the lens coordinates are:

$$\frac{f_0}{f_0+D}(h_0 \tan \theta - D - f_0), \frac{f_0}{f_0+D} \cdot \Delta y, \frac{f_0}{f_0+D} \cdot (h - h_0)$$

It will be seen that if $h_o \tan \theta = D + f_o$ there is no $x$ axis motion and this simplification is adopted in the embodiment. This means that in the recording system, $\theta$ must be made to vary with $h_o$ according to the relationship:

$$\tan \theta = (D+f_o)/h_o \quad \ldots\ldots (2)$$

and making $h-h_o=\Delta h$, the movements become:

$$0, \frac{f_o}{f_o+D}\cdot\Delta y, \frac{f_o}{f_o+D}\cdot\Delta h \quad (3)$$

which being simple expressions are very easily mechanized.

It must be recognized that this represents only one of the many different ways in which the free variables $\theta$, $\phi$, $f$ and $D$ may be constrained and that the choice will be optimized in different ways to meet different performance requirements.

The displacements of $O'$ from P are $D/f_o$ times the displacements of P from C, that is:

$$0, \frac{D}{f_o+D}\cdot\Delta y, \frac{D}{f_o+D}\cdot\Delta h$$

and since display enlargement is used in the ratio N:1, the displacements of $O''$ from P are:

$$0, \frac{ND}{f_o+D}\cdot\Delta y, \frac{ND}{f_o+D}\cdot\Delta h \quad (4)$$

For practical reasons, it is very desirable to keep $ND$ constant since $ND$ is the distance of the observer from the screen.

However, from the displacements given in (4), it will be seen that if the displacements of $O''$ from P are assumed to have fixed limits imposed by the mechanics of the design, then $\Delta y$ and $\Delta h$ have their greatest ranges when $f_o+D$ is as large as possible. But from equation (2) $f_o+D=h_o \tan \theta$, therefore, $h_o \tan \theta$ should be kept as large as possible.

Bearing in mind that $h_o$ is not assignable, but is a variable of the recording system, it follows that $\tan \theta$, and therefore $\theta$ itself, should be as large as possible. Therefore, $\theta$ is set at its greatest reasonable value $\theta_o$ and is held constant.

Making the viewing distance $ND$ equal to $L$, the displacements of $O'$ from P become:

$$0, \frac{L}{h_o \tan \theta_o}\cdot\Delta y, \frac{L}{h_o \tan \theta_o}\cdot\Delta h \quad (5)$$

and the displacements of P from C are:

$$0, \frac{f_o}{h_o \tan \theta}\cdot\Delta y, \frac{f_o}{h_o \tan \theta_o}\cdot\Delta h \quad (6)$$

The coefficients of $\Delta y$, $\Delta h$ in the two sets of coordinates are in constant proportion if $f_o$ is a constant and independent of $h_o$ and $\theta_o$.

Summarizing the preferred embodiment has the following characteristics:

$L = $ constant, $f_o = $ constant, $\theta_o = $ constant.

The way in which the theory considered above is applied to visual display equipment will now be described.

It is necessary, in the first place, to create a sequence of photographic transparencies, for example in the form of a motion picture film, in which each transparency corresponds to a known point on an assumed "ideal" flight path. The points correspond to the instantaneous positions which the recording "aircraft" would occupy at equally spaced intervals of time if the aircraft were proceeding along the ideal path at a predetermined "ideal" speed. Thus, if presented as a motion picture film without modification, the picture would correspond to that which would be seen from the aircraft under ideal conditions and would appear to show continuous motion, if a suitable picture frame speed were selected.

For the purpose of creating the initial sequence of transparencies, an area of the surface of the earth may be used or a suitably scaled representation of such an area may be used. Indeed, both actual surface and scaled model may be used, so long as the recording arrangements are substantially identical at the point of changeover.

The essential requirements are that the film should be inclined backwards at an angle $\theta_o$, the focal length of the recording lens should be $f_o$ and the tilt of the recording lens should be adjusted to ensure focus over the whole area of film picture frame. Where the focal length of the recording lens is not $f_o$ but $f$, the film image should be enlarged or reduced in the ratio $f_o:f$. The representation should preferably be recorded in color.

In films recorded from real aircraft, the flight path during recording may not be ideal. In such case, it is necessary to record the departures from the ideal flight path and to allow for these departures when the recorded transparencies are reproduced.

Figure 7A:
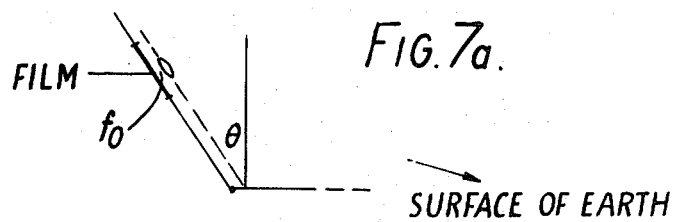
FIGS. 7a, 7b and 7c are diagrams of three optical arrangements which may be used in the recording equipment.
Figure 7B:
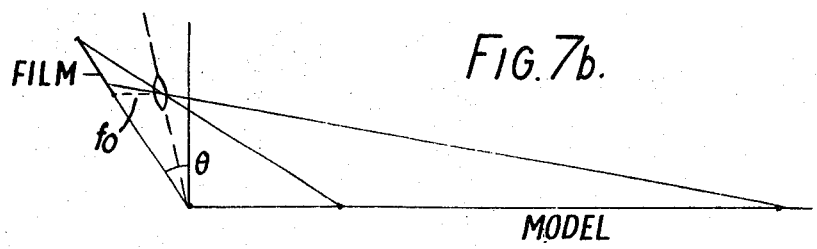

Thus, a motion-picture film may be produced either by photographing an area of the surface of the earth on an actual approach, as shown in FIG. 7a, or by photographing a model, as shown in FIG. 7b. In the first case, a special camera is used and, as the surface of the earth is effectively at infinity, the lens and the film need to be inclined at the same angle $\theta$.

Figure 7C:
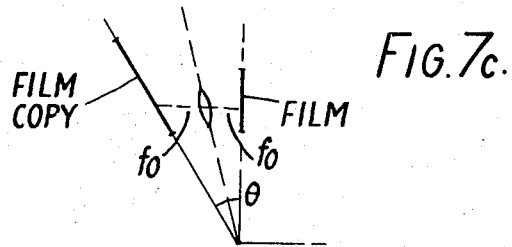

In the second case, the screen is inclined at the angle $\theta$, the focal length of the lens being $f_o$ in both cases. Alternatively, the view may be photographed normally and then copied frame by frame, as shown in FIG. 7c. Keeping the horizontal distance to the copy equal to $f_o$ is an advantage, since the need for corresponding changes of $f_o$ to be made in the projector arrangement is then avoided.

The projection apparatus will now be considered.

In simulation, both the observer and the screen are fixed in position and the representation of the earth's surface must be made to move. In the foregoing descriptions, conditions relating to the natural state have been assumed. Therefore, it is necessary to consider how the order of things may be changed to achieve the result required.

Figure 8A:
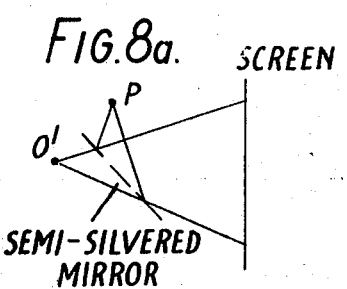
FIGS. 8a and 8b are diagrams of two optical arrangements which may be used for projection.
Figure 8B:
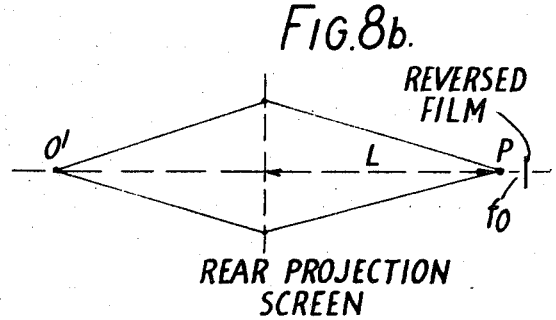

With the observer at $O'$, and a fixed vertical screen, at distance $L$ apart, typically 6 to 8 feet, and bearing in mind that C, P and $O'$ are in a fixed plane, it can be seen that the projector needs, on occasion (when $h=h_o$), to occupy the same position as the observer and an optical arrangement is necessary to avoid this condition. For this purpose, a semisilvered mirror may be used, as shown on FIG. 8a, or back projection with side to side reversal of the image of the transparency, as shown in FIG. 8b. The latter arrangement is preferred.

Referring to FIG. 8b as the positions of $O'$ and its image, are fixed, a case has been chosen where there is zero movement along the $x$ axis and the point P must be able to move on a plane parallel to that of the screen and distance $L$ away from the screen.

The movements on this plane are:

$$Y_P = \frac{-ND}{f_o+D}\cdot\Delta y = \frac{-L}{h_o \tan \theta_o}\cdot\Delta y \quad (7)$$

and $$Z_P = \frac{-ND}{f_o+D}\cdot\Delta h = \frac{-L}{h_o \tan \theta_o}\cdot\Delta h \quad (8)$$

However, the point P, in turn, was assumed to move with respect to C. It follows, therefore, that C, and the system to which it belongs, which is the film system, must translate on the same plane by the displacements:

$$Y_C = \frac{-f_o}{f_o+D}\cdot\Delta y = \frac{-f_o}{h_o \tan \theta_o}\cdot\Delta y \quad (9)$$

$$Z_C = \frac{-f_o}{f_o+D}\cdot\Delta h = \frac{-f_o}{h_o \tan \theta_o}\cdot\Delta h \quad (10)$$

which differ only in scale from the expressions for $Y_P$ and $Z_P$. The transparency must be recorded and reproduced under the conditions $$\tan \theta = (D+f_o)/f_o$$

As back projection is being used, the transparency is mounted with its horizon line at the level of C, at a distance $f_o$ therefrom, and rotated in accordance with the recording angle $\theta_o$.

Two final adjustments which are necessary in order to achieve a clear picture are correct focal length and tilt of the projection lens.

Figure 9:
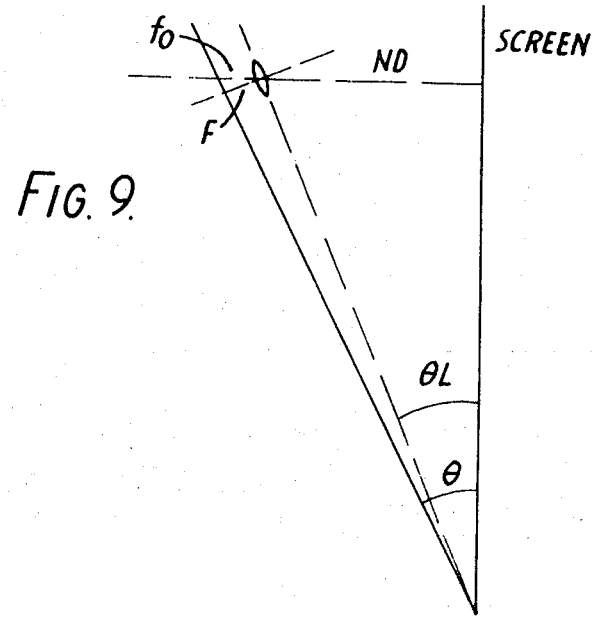
FIG. 9 is a diagram showing the geometry of the optical arrangement of FIG. 8b.

It will be observed from FIG. 9, that the required focal length is given by the expression:

$$F = f_o \cos \theta_L$$

and the tilt angle by the expression:

$$\theta_L \approx ND/ND + f_o$$

where the angle $\theta$ is fairly small.

Equations 7 and 8 and equations 9 and 10 are the control equations used in the visual display apparatus of the embodiment of the invention.

Figure 10:
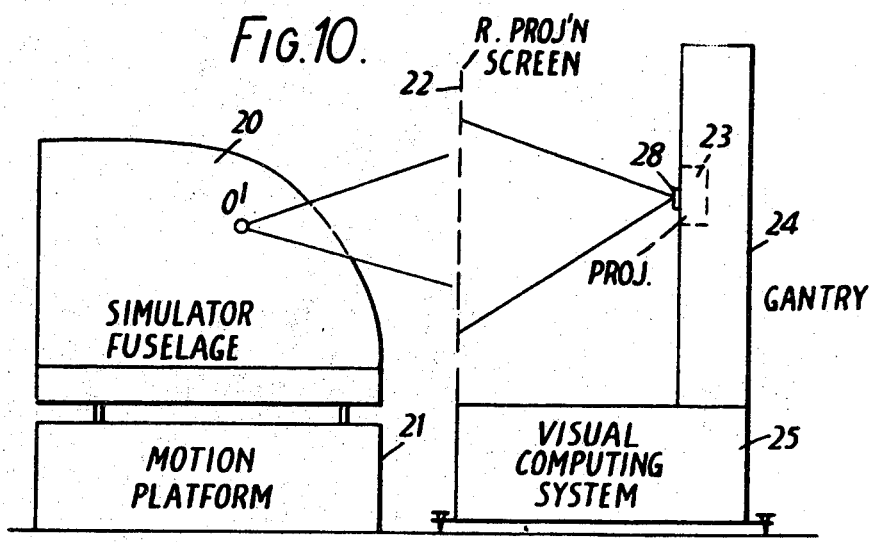
FIG. 10 is a diagram of a flight simulator in which a visual display is provided by apparatus of the invention.

In FIG. 10, the fuselage of a flight simulator in which a visual display of a scene is provided is indicated by the reference number 20. The fuselage 20 is mounted on a motion platform 21 and the scene is displayed on a translucent screen 22, the scene being visible to an observer at position O′, located within the fuselage.

The scene is provided by a projector 23, located at the rear of the screen 22, the projector being mounted on a gantry mechanism 24. Controlled motions of the projector are provided by a visual computing system 25, associated with the gantry to enable the simulated deviations of the course followed, from an ideal course, to be represented.

The computer of the flight simulator may be of the digital or of the analogue type. If the simulator computer is of the digital type, the drives to shafts by which the projector and gantry mechanisms are actuated would be step motors, incremented as necessary with 20 or more updatings per second. If the simulator computer is of the analogue type, the drives to the shafts would be provided by position servos, fed with signals derived from the flight computer.

As it is not possible to show circuit details in the digital case, a visual computing system will be described, by way of example, on the basis of the well-known analogue type of simulator.

Figure 11:
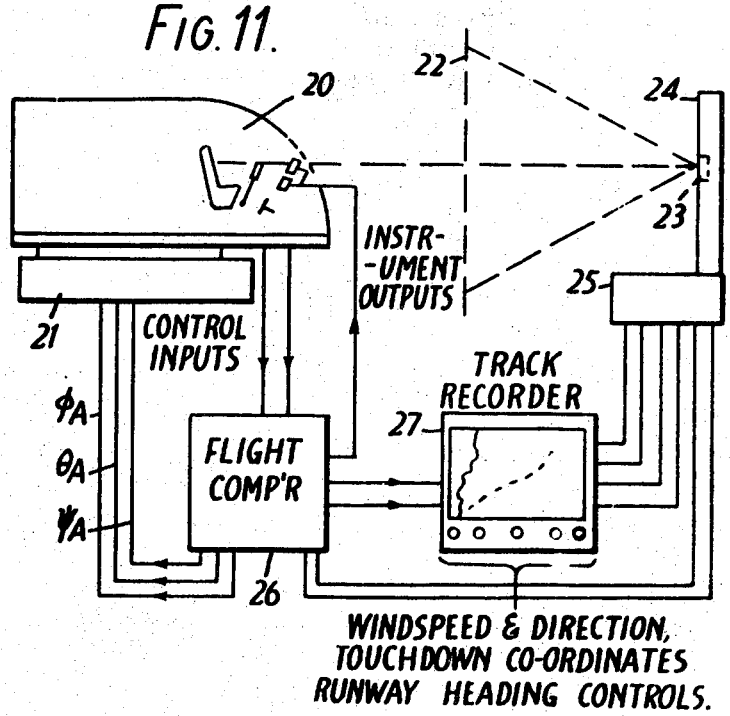
FIG. 11 is a diagram of a flight simulator in which inputs to the visual display apparatus are provided by an analogue computer.

Therefore, it is assumed that the simulator has a conventional analogue flight computing system, as shown in FIG. 11, in which displacements and attitude angles of the aircraft simulated, are computed in a flight computer 26. Inputs to the computers 26 are derived from the pilots flying controls and outputs are provided from the computer for actuating the pilots instruments, in a conventional manner.

Referring to FIGS. 10 and 11, the motion platform 21 provides roll, pitch and yaw motions of the fuselage 20, from attitude angle signals $\theta_A$; $\theta_A$; $\psi_A$, respectively, produced by the computer, which are representative of the assumed motions of the simulated aircraft.

Thus, the display apparatus, comprising the screen 22, the projector 23, the gantry mechanism 24 and the visual computing system 25 is required to produce only the changes in forward view resulting from linear displacements and for this purpose stands on the floor in front of the fuselage 20. For simplicity of explanation, it is assumed that heave motions are not used. If they were, a movement equal to the vertical movement of the fuselage would be given to the projector so as to keep the horizon at eye level for the pilot.

Airspeed signals, derived from the computer 26, are fed to a conventional cartesian coordinate track recorder 27. In the track recorder, ground speed and distance signals are derived, which together with height signals obtained from the computer 26, are fed to the visual computing system 25.

In FIG. 12, the main units of the track recorder and visual computing systems are shown. In the computer 26, true airspeed is resolved with respect to heading to provide northing and easting airspeed signals $V_tN$–S and $V_tE$–W respectively, and in the track recorder, wind velocity is resolved with respect to wind direction to provide northing and easting wind velocity signals $V_wN$–S and $V_wE$–W, respectively.

The resolved true airspeed and wind velocity signals $V_tN$–S and $V_wN$–S are fed to input terminals 30′ and 30″ of an amplifier 30 and are assumed to provide from the output of the amplifier 30, a northing component of ground velocity $V_gN$–S. The resolved true airspeed and wind velocity signals $V_tE$–W and $V_wE$–W are fed to input terminals 31′ and 31″ of an amplifier 31 and are summed to provide from the output of the amplifier 31 an easting component of ground velocity $V_gE$–W.

The ground velocity components $V_gN$–S and $V_gE$–W are integrated by leadscrew servos 32 and 33, respectively, to produce northing and easting coordinate signals $V_tN$–S and $V_tE$–W and mechanical displacements which define the track. At the same time, the ground velocity components are fed to a resolver 34 to give new ground velocity components $V_gR_1$ and $V_gR_t$ along and at right angles to the runway respectively, for use in the visual system, the rotor of the resolver being set to an angular position corresponding to runway heading.

Signals corresponding to the coordinates of a desired point of touchdown $V_P$ N–S and $V_P$ E–W, derived from potentiometers in the track recorder, which are not shown in the drawing, are fed to input terminals 35′ and 36′ of amplifiers 35 and 36, respectively, and the coordinate signals $V_tN$–S and $V_tE$–W are fed to input terminals 35″ and 36″ respectively of the amplifiers 35 and 36, so that the $V_PN$–S and $V_tN$–S signals and the $V_PE$–W and the $V_tE$–W signals are summed. The output signals from the amplifiers 35 and 36 are fed to a resolver 37. The rotors of the resolver 34 and the resolver 37 are mechanically coupled and are set to an angular position corresponding to runway heading.

Hence, output signals $V_d$ $R_1$ and $V_d$ and $R_t$ are provided from the rotor of the resolver 37, representing displacements along the runway and at right angles to the runway from the touchdown point, for feeding to the visual computing system.

In the visual computing system 25, FIG. 11, the signals $V_gR_1$ and $V_dR_1$ are fed to an electromechanical servo 38, the signals $V_gR_t$ and $V_dR_t$ are fed to an electromechanical servo 39 and height signals H and $dh/dt$, from the computer 26, are fed to an electromechanical servo 40. The electromechanical servos 38, 39 and 40 have output shafts 41, 42 and 43, respectively, the shaft 41 being coupled to the film drive and shutter mechanism of the projector 23, FIG. 10, the shaft 42 being coupled to mechanism of the gantry 24, FIG. 11, for providing transverse motion of the projector 23, and the shaft 43 being coupled to mechanism of the gantry 24, for providing vertical motion of the projector 23.

Each of the electromechanical servos 38, 39 and 40 has in essence a dual mode of control through two feedback loops, one of high gain and the other of low gain. The high gain mode of control is a speed control system and the low gain mode of control is a position control system. The latter is used mainly to ensure that the visual and track recorder positions do not become unsynchronized during running. The former ensures that during the period when the visual system is running, the velocities of the visual system servos correspond closely to those of the simulated aircraft, so avoiding the granularity which is normally present in a positioning system.

Incorporated in the electromechanical servo 40 is a synchro-transmitter unit 44, by which electrical signals are provided from terminals 45 for feeding to the projector unit 23.

Figure 13:
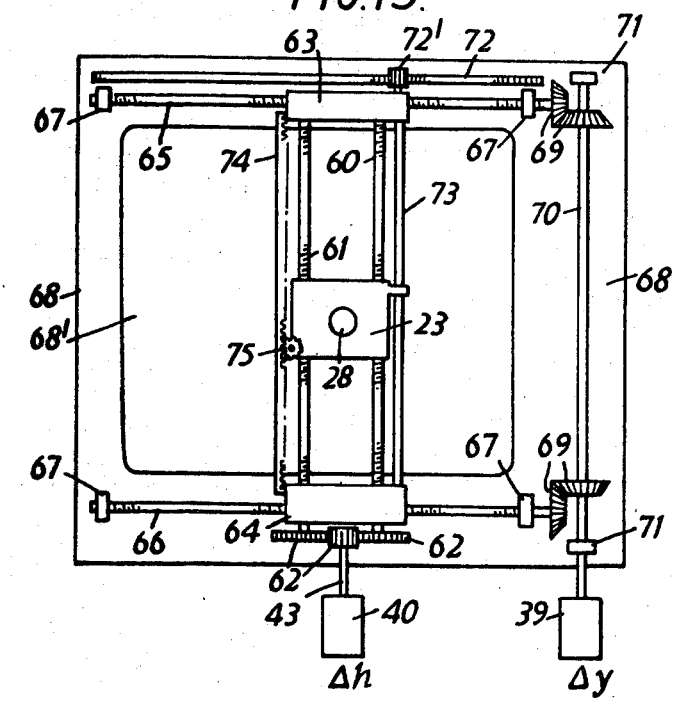
FIG. 13 is a diagram of gantry mechanism by which motion is imparted to the projector.

In FIG. 13, the gantry mechanism and the projector unit are indicated by reference numbers 24 and 23, as in FIG. 10, and the electromechanical servos by which motion is imparted to the projector 23 are indicated by reference numbers 39 and 40, as in FIG. 12.

Referring to FIG. 13, vertical motion is imparted to the projector 23 by a pair of lead screws 60 and 61 which are driven by way of pinions 62 from the shaft 43 of the electromechanical servo 40. The lead screws 60 and 61 are supported in bearing blocks 63 and 64, in a manner to provide a carriage for the projector 23. The bearing blocks are in turn supported by lead screws 65 and 66 with their axes at right angles to the axes of the lead screws 60 and 61, in bearings 67 mounted on a frame 68. Clearance for the body of the projector 23 is provided by an aperture 68′ in the frame. The lead screws 65 and 66 are driven by bevel gears 69 mounted on the lead screws 65 and 66 and on a shaft 70. The shaft 70 is coupled to the electromechanical servo 39 and is supported in bearings 71, mounted on the frame 68.

A rack 72, mounted on the frame 68 adjacent the lead screw 65 and parallel along its length to the axis of the lead screw, engages a pinion 72′, attached to one end of a spline shaft 73. The spline shaft 73 is supported in the bearing blocks 63 and 64 with its axis parallel to the axis of the lead screw 60, in a manner such that the spline shaft is free to rotate and y axis movements may be transmitted to the film carriage of the projector 23.

A rack 74, supported at its ends by the bearing blocks 63 and 64, parallel along its length to the axis of the lead screws 61, engages a pinion 75, so that z axis movements may be transmitted to the film carriage of the projector 23.

In FIG. 14, the projector is indicated generally by the reference number 23, parts of the z axis lead screws and the spline shaft by the reference numbers 60, 61 and 73, respectively, as in FIG. 13. The lens of the projector is indicated by the reference number 28, as in FIG. 10.

It will be apparent from equations 7, 8, 9 and 10 that, in the projector 23, as the lens 28 is moved by the horizontal and vertical drive servos of the gantry, it is necessary for the film carriage, which is enclosed in a housing 80, to be moved with respect to the lens 28 at a rate which is reduced in the ratio $f_o/L$. Part only of the body 80 is shown in the drawing, the rear portion in which the spools carrying the film are housed having been broken away for the sake of clarity.

The desired reduced movements of the film carriage along the z axis, in directions as shown in the drawing by arrows 81 and 81', are provided by lead screws 82 and 83, having screw threads of appropriate pitch, which are mounted to rotate in bearings provided by supporting blocks 84 and 84'. The lead screws 82 and 83 are driven from the pinion 75, FIG. 13, by way of a shaft 85, a pair of bevel gears 86, a spline shaft 87 and four spiral gears, two only of which are visible in the drawing and indicated by the reference numbers 88 and 88'. The shaft 85 and the spline shaft 87 are mounted to rotate in bearings 89 and 89', which are attached to a chassis member 90 of the projector 23. The spiral gears by which the spiral gears 88 and 88' are driven, which are not shown in the drawing, are housed within the supporting block 84 and are adapted to cooperate with the spline shaft so as to enable the supporting blocks 84 and 84' to move along the y axis, in directions as shown in the drawing by arrows 92 and 92'.

The desired reduced movements of the film carriage along the y axis in the directions 92 and 92' are provided by lead screws 93 and 94, having screw threads of appropriate pitch.

The lead screws 93 and 94 are driven from the spline shaft 73, by way of pinions 95 and 96, a shaft 97 and two pairs of bevel gears 98 and 99. The shaft 97 is mounted to rotate in bearings 100 and 100', which are attached to a body member 107 of the projector chassis. The pinion 96 is adapted to cooperate with the spline shaft 73, in a manner to enable the projector as a whole to move in the directions 81 and 81', and is maintained in engagement with the pinion 95 by a retaining piece 101 attached to the body member 102.

The lead screw 93 is mounted to rotate in bearings 102 and 102', which are attached to the chassis member 90 and the lead screw 94 is mounted to rotate in bearings 103 and 103', which are attached to a chassis member 90'. The supporting block 84 is mounted so that it is free to slide on a guide rod 105, the guide being attached to the body member 90' by blocks 106 and 106', so that the axis of the guide rod is parallel to the axis of the spline shaft 87. The lead screw 93 passes through a threaded hole in the supporting block 84 and the lead screw 94 passes through a threaded hole in the supporting block 84'. The axes of the threaded holes are at right angles to the axes of the lead screws 82 and 83; hence, linear motion of the film carriage in the desired directions indicated by the arrows 92 and 92' is provided.

The lead screws 82 and 83 pass through threaded holes in the forward part of the body of the housing 80, the axes of the holes being in a direction such that linear movements of the film carriage, in directions indicated by the arrow 81 and 81' is provided.

The body 80 incorporates conventional motion picture, shutter and film transport mechanism, but the speed of projection is controlled by a motor 104 of the servo 38, FIG. 12, in accordance with computed ground speed along the approach path.

Figure 15:
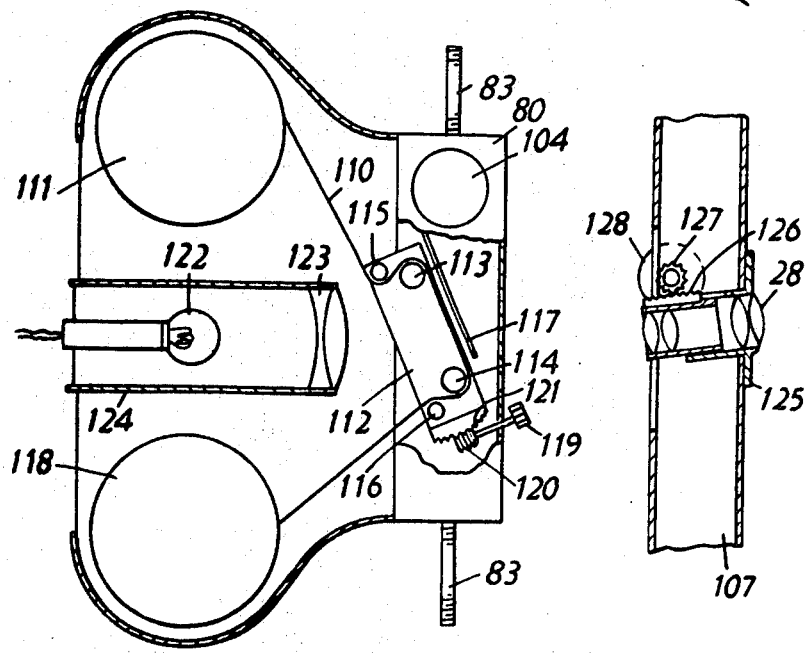
FIG. 15 is a simplified, part sectional diagram showing parts of the projector.

In FIG. 15, the housing, part of the body member of the projector, the projection lens, the motor by which the mechanism of the projector is driven and one of the lead screws of the gantry mechanism are indicated by reference numbers 80, 108, 28, 104 and 83, respectively, as shown in FIG. 14.

Referring to FIG. 15, motion picture film 110, providing a succession of photographic transparencies of the changing scene during a desired approach, is stored on a reel 111 and is transported through the gate in a film carriage 112, by sprocket wheels 113 and 114, by way of guide rollers 115 and 116, behind a shutter 117 and is transferred to a takeup reel 118 in a conventional manner.

The film carriage 112 is inclined with respect to the screen 22, FIG. 11, so that the plane of the frame of the film within the gate and the plane of the screen make an angle $\theta_o$ with each other, the angle being set to the desired value by a control 119. For this purpose, the control 119 is coupled by a shaft to a worm wheel 120 which engages a toothed quadrant 121, attached to the film carriage 112. The frame of the film which is within the gate is illuminated by an electric lamp 122 and a condenser lens 123, the lamp and the lens being mounted within a lamp housing 124. The lamp housing is supported from the body member 107 of the projector, by means which are not shown in the drawing, so that the image of the source of light falls on the aperture of the lens 28 and maximum brightness of the projected picture is provided.

The projection lens 28 is provided with a support 125, which is attached to the lens mount and to the body member 107 of the projector, so that the plane of the lens makes the desired angle of tilt $\theta_L$ with respect to the angle of inclination of the film.

The focal length of the lens 28 is varied as the lens position changes, by an amount corresponding to the variation of the distance F, FIG. 9, along the lens axis to the surface of the film. The incremental change necessary is $\Delta h \tan \theta_o$; hence the focus of the lens is controlled by a scaled version of $\Delta h$. For this purpose, the lens 28 is provided with a mount by which the distance between components of the lens may be varied by rack and pinion mechanism 126 and 127, respectively. The pinion 127 is mechanically coupled to a control synchro 128, which is driven by signals derived from the synchro transmitter unit 44, FIG. 12. The control synchro incorporates a speed reduction gear, the ratio of which is chosen so that the desired scaling of the displacement produced by the servo 40, FIG. 12, is provided.

I claim:

1. Apparatus for providing a visual display simulating the view of a ground surface substantially as the surface would appear to an observer in a craft passing over the said ground surface comprising image recording means and image projection means; the image recording means including a camera optical system and defining a first image plane, said first image plane intersecting said ground surface along a first line of intersection; and the image projection means including a projection optical system and defining a second image plane and a projected image plane, said second image plane intersecting said projected image plane along a second line of intersection.

2. Apparatus for providing a visual display as claimed in claim 1 wherein the observer views the projected image on a projection screen, wherein the projection screen lies in a plane parallel to said projected image plane and wherein the observer is located on a line passing through the optical center of the camera optical system and the optical center of the projection optical system when the image recording means and image projection means are oriented so that said first and second lines of intersection are coincident.

3. Apparatus for providing a visual display as claimed in claim 1 wherein the camera optical system has a midplane which includes said first line of intersection and the projection optical system has a midplane which includes said second line of intersection.

4. A method of providing a visual display simulating the view of a ground surface, substantially as the surface would appear to an observer in a craft passing over the said ground surface, comprising sequential operations of image recording and record image projection, including:

forming a first image of an area of said ground surface upon a first image plane by means of a camera optical system, said first image plane being inclined to said ground surface;

recording picture information from said first image; deriving from said recorded picture information a record image on a second image plane;

projecting a viewed image from said record image upon a projection plane by means of a projection optical system, said projection plane being inclined said second image plane;

aligning said first image plane and ground surface inclination and said second image plane and projection plane inclination such that with said first and second image planes oriented to be coincident, so that said first and second images are coincident point for point, the said ground surface, the first/second image plane and the projection plane all intersect one another on a single common line.

5. A method of providing a visual display as claimed in claim 4 further including providing a magnified projected image on a projection screen located in a plane parallel to said projection plane and locating the observer on a line passing through the optical center of said camera and projection optical system.

* * * * *